United States Patent
Park (10) Patent No.: US 6,940,850 B2
(45) Date of Patent: Sep. 6, 2005

(54) ADD/DROP CROSS CONNECTION APPARATUS FOR SYNCHRONOUS DIGITAL HIERARCHY

(75) Inventor: Jai Young Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 939 days.

(21) Appl. No.: 09/756,866

(22) Filed: Jan. 10, 2001

(65) Prior Publication Data

US 2001/0007564 A1 Jul. 12, 2001

(30) Foreign Application Priority Data

Jan. 10, 2000 (KR) .......................................... P2000-897

(51) Int. Cl.[7] .......................... H04L 12/50; H04L 12/56
(52) U.S. Cl. ..................... 370/369; 370/427; 370/535; 370/543; 370/404
(58) Field of Search ................................ 370/369, 389, 370/392, 403–406, 535–543, 427–428, 507, 396, 397, 408–409; 398/83

(56) References Cited

U.S. PATENT DOCUMENTS

| 5,555,248 A | 9/1996 | Sugawara |
| 5,574,717 A | 11/1996 | Tomizawa et al. |
| 5,777,998 A | 7/1998 | Traverso et al. |
| 5,799,001 A | 8/1998 | Lee et al. |
| 5,914,952 A | 6/1999 | Eom et al. |
| 6,011,802 A | * 1/2000 | Norman ...................... 370/539 |
| 6,094,440 A | 7/2000 | Sugawara et al. |
| 6,169,753 B1 | * 1/2001 | Yoshida ...................... 370/507 |
| 6,256,292 B1 | * 7/2001 | Ellis et al. .................. 370/404 |
| 6,292,485 B1 | * 9/2001 | Trotta et al. ................ 370/389 |

* cited by examiner

Primary Examiner—Steven Nguyen
(74) Attorney, Agent, or Firm—Robert E. Bushnell, Esq.

(57) ABSTRACT

An add/drop cross connection apparatus of an SDH system, comprises an aggregate unit matching device for providing matching with the aggregate units, a higher order path connection circuit for subjecting received higher order path data to cross connection by space switching, a lower order path connection circuit for subjecting received lower order path data to cross connection by space switching, and a selector for selectively delivering the data supplied from the aggregate units, higher order tributary device, and lower order tributary device, wherein the selector delivers the data to the higher order path connection circuit or lower order path connection circuit according as the data is the higher or lower order path data.

15 Claims, 6 Drawing Sheets

ADD/DROP CROSS CONNECTION APPARATUS FOR SYNCHRONOUS DIGITAL HIERARCHY

CLAIM OF PRIORITY

This application makes reference to, incorporates the same herein, and claims all benefits accruing under 35 U.S.C §119 from an application entitled Add/Drop Cross Connection Apparatus For Synchronous Digital Hierarchy earlier filed in the Korean Industrial Property Office on 10, Jan. 2000, and there duly assigned Ser. No. 2000-897 by that Office.

BACKGROUND OF THE INVENTION

1. Field of the Invention

The present invention relates to a synchronous digital hierarchy system (SDH System), and more particularly to an add/drop cross connection apparatus for an SDH system.

2. Description of the Related Art

Cross-connects are electronic multiport switches for digital traffic and are known in the United States as digital cross-connect switches (DCSs) and as DXCs elsewhere. They are classified as DCS p/q or DXC p/q, where p is the hierarchical order of a port bit rate and q is the hierarchical order of the traffic component that is switched within that port bit rate.

DXC/DCS can occur in two main types. Higher order cross-connects, generally used to route bulk traffic in blocks of nominally 155 MBPS for network provisioning or restoration, and are designated as DXC 4/4. Lower order cross-connects (DXC 4/1, or 1/1) are used for time switching leased lines, consolidation, and service restoration.

In an add/drop cross connection apparatus of an exemplary SDH system, the data supplied from a west or east aggregate unit is divided into lower and the higher order path data. The lower order path data (or lower order virtual container (VC)) may be TU11 (Tributary Unit 11) or TU12 data processed by a TU pointer while the higher order path data (or higher order virtual container) may be AU3 (Administrative Unit 3) or AU4 data and has an AU pointer.

The lower order path data supplied from the west or east aggregate unit is matched to the system clock through a multiplex section adaptation circuit and supplied to a higher order path overhead monitor circuit. The higher order path overhead monitor circuits respectively monitors the higher order path overheads of the data respectively supplied from the multiplex section adaptation circuits, which are then delivered to the higher order path connection circuit. The higher order path connection circuit performs the cross connection to the lower order path data by space switching and supplying the lower order path data to the lower order path data processor, which performs the cross connection to the data, aligns the data, and detects and monitors various path overheads. The data processed by the lower order path data processor is delivered to a lower order tributary device.

Meanwhile, the higher order path data supplied from the west or east aggregate unit and supplied to the higher order path overhead monitor circuit is matched to the system clock through the multiplex section adaptation circuit. The higher order path overhead monitor circuit respectively monitors the higher order path overheads of the data respectively supplied from the multiplex section adaptation circuits and delivers the higher order path data to the higher order path connection circuit. The higher order path connection circuit performs the cross connection to the higher order path data by space switching and supplies the higher order path data to a higher order tributary device, which may be a known device such as DS3 (Digital Signal Level 3 of 44.736 MBPS), OC-1 (Optical Carrier supporting a Synchronous Transport Signal, Level 1 of 51.840 MBPS), STM-1 (Synchronous Transport Module, Level 1 of 155.520 MBPS) or STM-4 (Synchronous Transport Module, Level 4 of 622.080 MBPS) equipment. The SDH system is based upon the fundamental STM-1 rate, which is three times the fundamental SONET (Synchronous Optical NETwork) rate. The typical transmission media is defined to be an optical fiber, but the Broadband ISDN specification does define a User-Network Interface (UNI) STM-1 operating over coaxial cables.

In addition, the lower order path data supplied from the lower order tributary device is subjected through the lower order path data processor to the cross connection by time switching and delivered to the higher order path connection circuit. The higher order path connection circuit subjects the input data to cross connection by space switching and then supplies the data via a higher order unequipped generator to the west or east aggregate units. Meanwhile, the higher order path data supplied from the higher order tributary device is subjected through the higher order path connection circuit to cross connection by space switching and delivered through the higher order unequipped generator to the west or east aggregate units.

Hence, such add/drop cross connection apparatus is so complicated as to have one connecting path connecting it to the lower order tributary device and to separately have a second connecting path connecting it to the higher order tributary device.

Incorporated by reference herein are: U.S. Pat. No. 6,094,440 to Toshiki Sugawara et al. entitled Multiplex Type Transmitting Apparatus; U.S. Pat. No. 5,914,952 to Doo Seop Eom et al. entitled Tributary Unit Signal Cross-Connection Apparatus; U.S. Pat. No. 5,799,001 to Dong Choon Lee et al. entitled Composite Network Protective/Recovering Device For Synchronous Digital Hierarchy DXC; U.S. Pat. No. 5,777,998 to Giovanni Traverso et al. entitled Method And Circuit Arrangement For The Realization Of The Higher Path Adaptation/Mapping Function In Synchronous Digital Hierarchy/Optical Network Equipment; U.S. Pat. No. 5,574,717 to Masahito Tomizawa et al. entitled Line Terminating Equipment In SDH Networks, Using Forward Error Correcting Codes; and U.S. Pat. No. 5,555,248 to Eiji Sugawara entitled Tandem Connection Maintenance System.

SUMMARY OF THE INVENTION

It is an object of the present invention to provide an add/drop cross connection apparatus of an SDH system that is simplified by combining the path connecting the lower order tributary device and the path connecting the higher order tributary device.

According to an aspect of the present invention, an add/drop cross connection apparatus of an SDH system, comprises an aggregate unit matching device for providing matching with the aggregate units, a higher order path connection circuit for subjecting received higher order path data to cross connection by space switching, a lower order path connection circuit for subjecting received lower order path data to cross connection by space switching, and a selector for selectively delivering the data supplied from the aggregate units, higher order tributary device, and lower order tributary device, wherein the selector delivers the data to the higher order path connection circuit or lower order path connection circuit according to whether the data is the higher or lower order path data.

The present invention will now be described more specifically with reference to the drawings attached only by way of example.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Throughout descriptions in connection with the drawings, same reference numerals are used to represent same functional parts for conveniences sake. In addition, there are omitted detailed descriptions of the conventional parts not required to comprehend the technical concept of the present invention.

Figure 1:
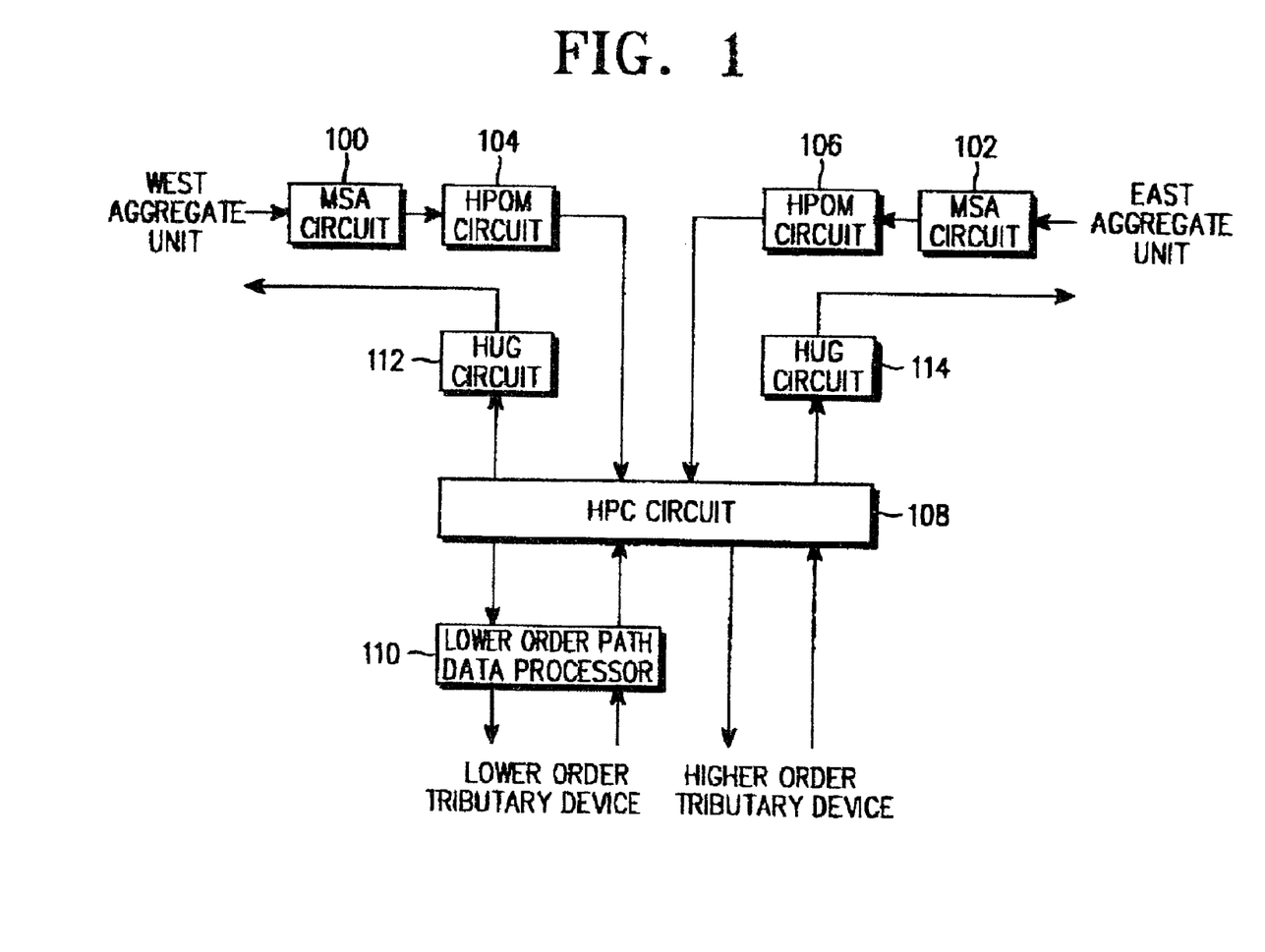
FIG. 1 is a block diagram for illustrating the structure of a complicated add/drop cross connection apparatus of an SDH system.

Referring to FIG. 1 for illustrating the structure of the add/drop cross connection apparatus of an SDH system, the data supplied from the west or east aggregate unit is divided into the lower and the higher order path data. The lower order path data is TU11 (Tributary Unit 11) or TU12 data processed by a TU pointer while the higher order path data is AU3 (Administration Unit 3) or AU4 data.

The lower order path data supplied from the west or east aggregate unit is matched to the system clock through the multiplex section adaptation (MSA) circuits 100 or 102, and supplied to the higher order path overhead monitor (HPOM) circuits 104 or 106. The HPOM circuits 104 and 106 respectively monitor the higher order path overheads of the data respectively supplied from the MSA circuits 100 and 102, which are delivered to the higher order path connection (HPC) circuit 108. The HPC circuit 108 performs the cross connection to the data by space switching, and supplies the data to the lower order path data processor 110, which performs the cross connection to the data, aligns the data, and detects and monitors various path overheads. The data processed by the lower order path data processor 110 is delivered to the lower order tributary device.

Meanwhile, the higher order path data supplied from the west or east aggregate unit is matched to the system clock through MSA circuits 100 or 102, and supplied to the HPOM circuits 104 or 106. The HPOM circuits 104 and 106 respectively monitor the higher order path overheads of the data respectively supplied from the MSA circuits 100 and 102, and delivers the data to HPC circuit 108. The HPC circuit 108 performs the cross connection to the data by space switching, and supplies the data to the higher order tributary device, which may be DS3, OC-1, STM-1 or STM-4 equipment.

In addition, the lower order path data supplied from the lower order tributary device is subjected through the lower order path data processor 110 to the cross connection by time switching, and delivered to the HPC circuit 108. The HPC circuit 108 subjects the input data to cross connection by space switching, and delivers the data through the higher order unequipped generators (HUG) 112 or 114 to the west or east aggregate units. Meanwhile, the higher order path data supplied from the higher order tributary device is subjected through the HPC circuit 108 to cross connection by space switching, and delivered through HUGs 112 or 114 to the west or east aggregate units.

Hence, such add/drop cross connection apparatus is so complicated as to have one connecting path connecting it to the lower order tributary device and to separately have a second connecting path connecting it to the higher order tributary device.

Figure 2:
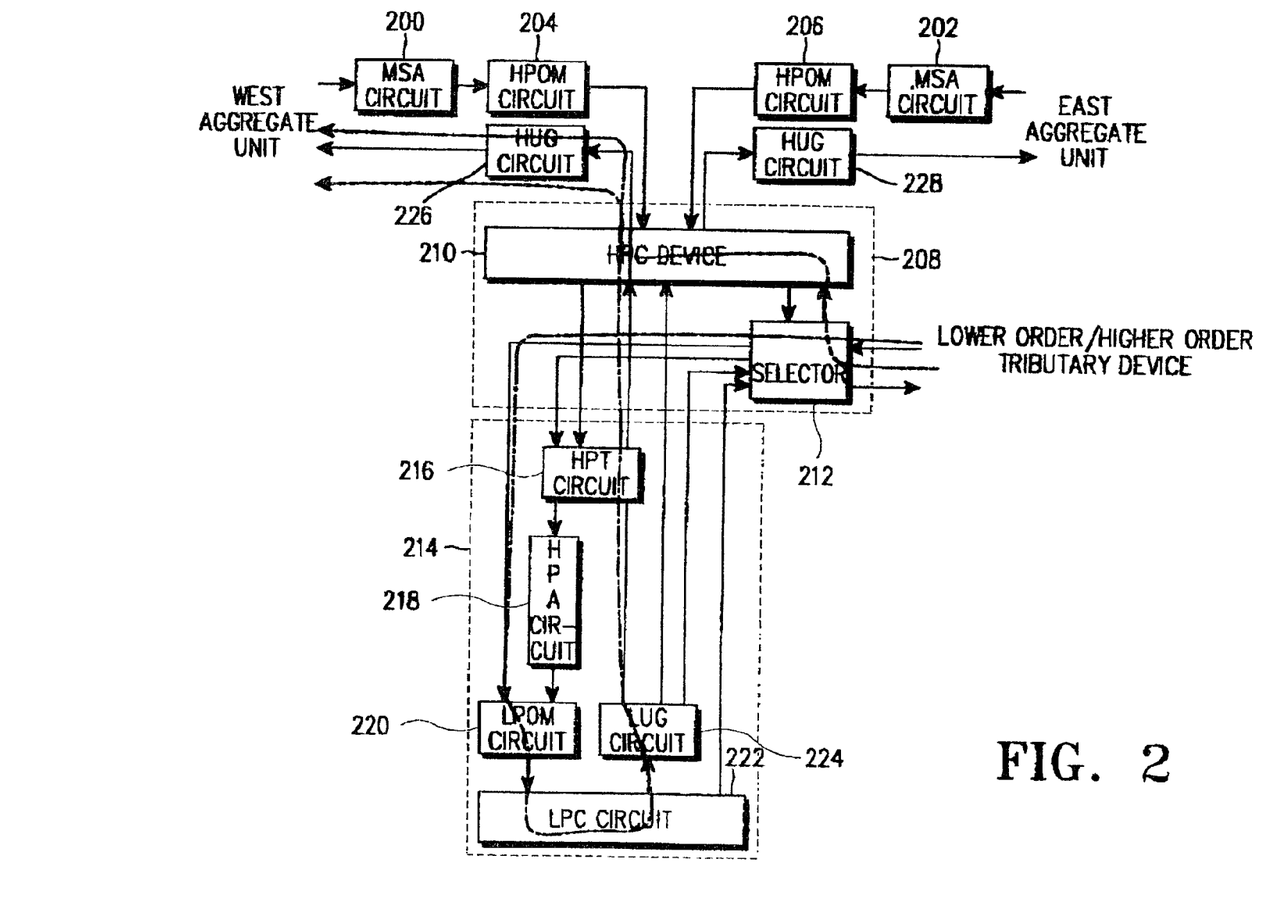
FIGS. 2 to 6 are block diagrams for illustrating the add/drop cross connection apparatus of an SDH system according to the invention.

Referring to FIG. 2, MSA circuits 200 and 202 respectively match the data received from the west and east aggregate units to the system clock through pointer processing. The data is then delivered to the respective HPOM circuits 204 and 206, which detect and monitor the higher order overheads to be delivered to the HPC circuit 208. The HUG circuits 226 and 228 generate unequipped signals to transfer the data from the HPC circuit 208 to the west or east aggregate unit. The MSA circuits 200 and 202, HPOM circuits 204 and 206, and HUGs 226 and 228 constitute the aggregate unit matching device to provide matching with the aggregate units.

The HPC circuit 208 comprises an HPC device 210 and a selector 212. The HPC device 210 performs cross connection by space switching to the data supplied from the HPOM circuits 204 and 206, lower order path data processor 214, or higher order tributary device. The selector 212 selectively delivers the input data to the lower order path data processor 214, lower order tributary device, high order tributary device, or HPC device 210, which is initially determined by the operator.

The lower order path data processor 214 comprises a higher order path termination (HPT) circuit 216 for processing POH of VC3/VC4, higher order path adaptation (HPA) circuit 218 for aligning data by unit of TU11 or TU12, lower order path overhead monitor (LPOM) circuit 220 for detecting known path overhead bytes (J2 (path trace signal), V5 (BIP-2: a bit interleaved parity operation), etc.), lower order unequipped generator (LUG) 224 for generating unequipped signals by unit of VC11 or VC12, and lower order path connection (LPC) circuit 222 for performing cross connection by time switching to TU11 or TU12 signals.

Describing transference of data in the add/drop cross connection apparatus, the tributary device of DS1 (1.544 MBPS) or DS1E (3.152 MBPS) equipment inputs the lower order path data TU11 or TU12 subjected to TU pointer processing to the selector 212 in order to deliver it to the west aggregate unit. Then, the selector 212, as shown by the dash-dot-dash line in FIG. 2, delivers the input data through LPOM circuit 220 to LPC circuit 222 to LUG 224 to HPT circuit 216 to HPC device 210 to HUG circuit 226 to the west aggregate device.

In addition, the tributary device of DS3, OC-1, STM-1 or STM-4 equipment inputs the higher order path data AU3 or AU4 to the selector 212 to deliver it to the west aggregate unit. Then, the selector 212, as shown by the dash-dash-dash line in FIG. 2, delivers the input data through HPC device 210 to HUG circuit 226 to the west aggregate. Accordingly, selector 212 routes the data based on whether the data is received from a high order tributary device or a low order tributary device. That is, selector 212 is a kind of space switching apparatus for selecting a path of TU11/TU11 (DS1/DS1E Interface Equipment) and VC3/VC4 (DS3/STM-1/STM-4 Interface Equipment). The selector does not discriminates the input date by using an any other specific method but select whether or not the input data is transmitted by way of HPT, HPA in response to a determination of whether the input data is input through the low speed interface apparatus (DS1/DS1E) or the high speed interface apparatus (DS3/STM-1/STM-4).

Figure 3:
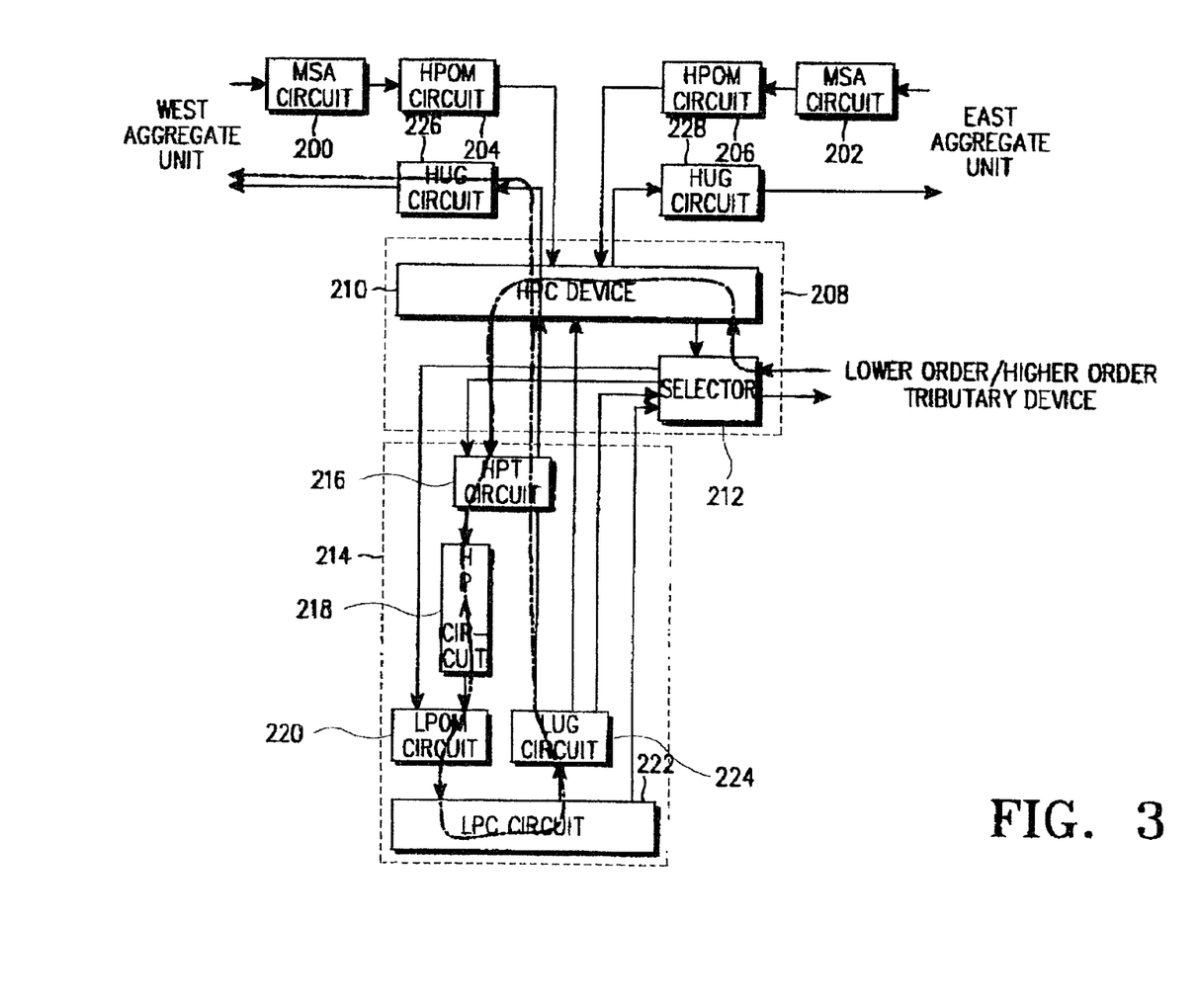

In addition, the tributary device of DS3, OC-1, STM-1 or STM-4 equipment inputs the higher order path data AU3 or AU4 subjected to lower order path cross connection to the selector 212 to deliver it to the west aggregate unit. Then, the selector 212, as shown by the dash-dot-dash line in FIG. 3, delivers the input data through HPC device 210 to HPT 216 to HPA circuit 218 to LPOM circuit 220 to LPC circuit 222 to LUG circuit 224 to HPT circuit 216 for lower order path crossing, finally through HPC device 210 to HUG circuit 226 and then to the west aggregate unit. The HPC device routes the data according to the known ITU Standard G.783.

Figure 4:
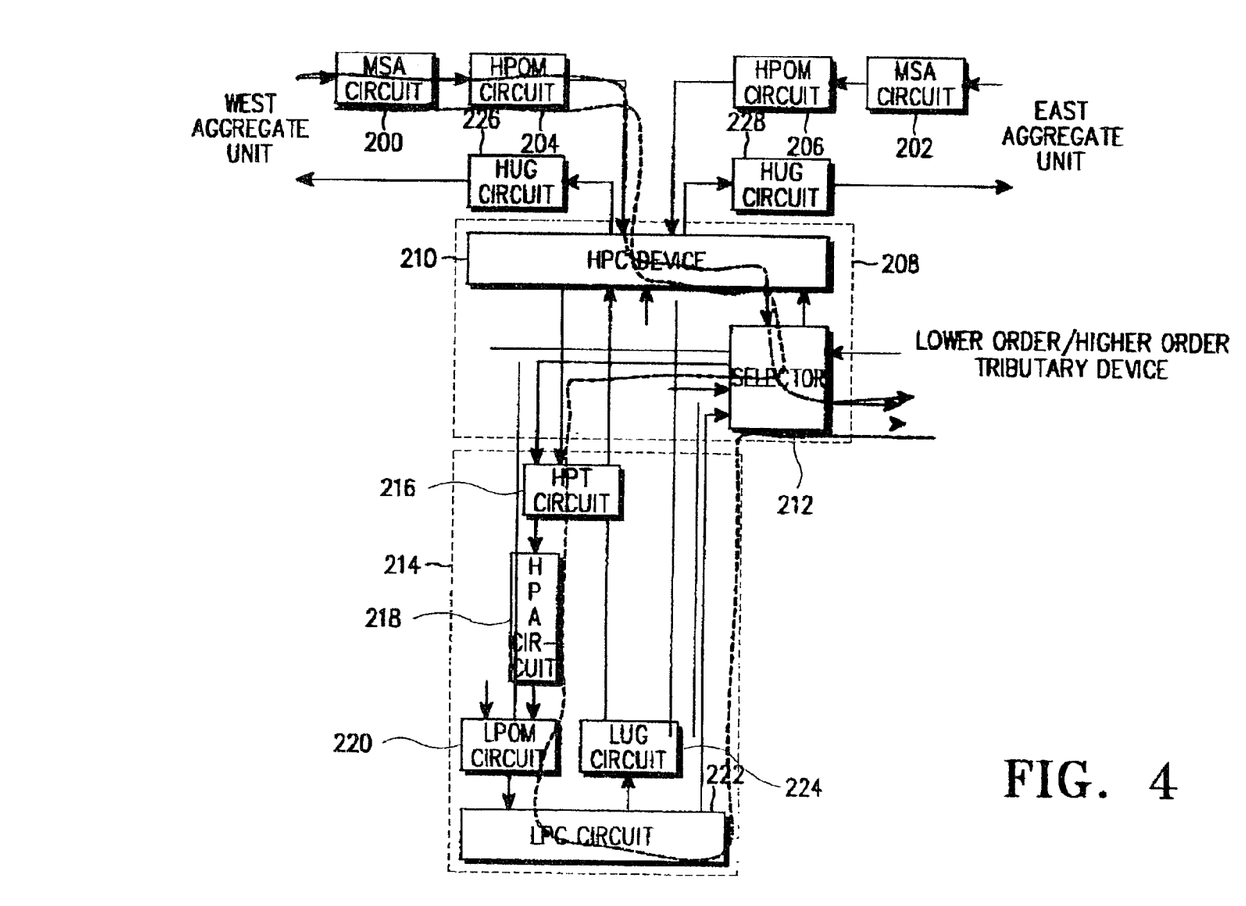

When the west aggregate unit delivers the lower order path data to the tributary device of DS1 or DS1E equipment, the data input through MSA circuit 200 to HPOM circuit 204 is delivered through HPC device 210 to selector 212, which, as shown by the dash-dash-dash line in FIG. 4, delivers the data through HPT circuit 216 to HPA circuit 218 to LOPM circuit 220 to LPC circuit 222. Finally, the selector 212 delivers the data received from the LPC circuit 222 to the lower order tributary device.

In addition, the west aggregate unit delivers the higher order path data through MSA circuit 200 to HPOM circuit 204 to HPC device 210 to selector 212 to the higher order tributary device of DS3, OC-1, STM-1 or STM-4 equipment, as shown by te dash-dot-dash line in FIG. 4.

Figure 5:
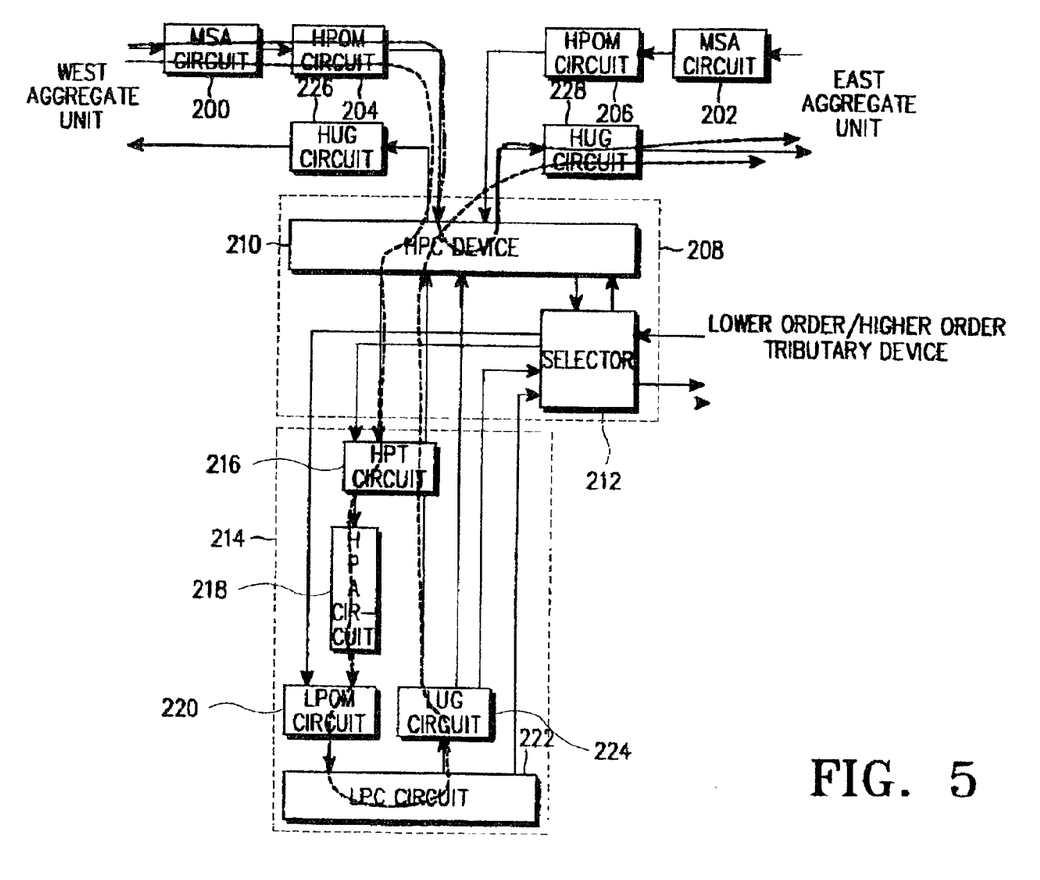

When the west aggregate unit sends the higher order path data to the east aggregate unit, the input data, as shown by the dash-dot-dash line in FIG. 5, is delivered through MSA circuit 200 to HPOM circuit 204 to HPC device 210 to HUG circuit 228 to the east aggregate unit.

In addition, when the west aggregate unit sends the lower order path data to the east aggregate unit, the input data, as shown by the dash-dash-dash line in FIG. 5, is delivered through MSA circuit 200 to HPOM circuit 204 to HPC device 210 to UPT circuit 216 to HPA circuit 218 to LOPM circuit 220 to LPC circuit 222 to LUG circuit 224 to HPT circuit 216 to HPC device 208 and, finally, through HUG circuit 206 to the east aggregate unit.

Figure 6:
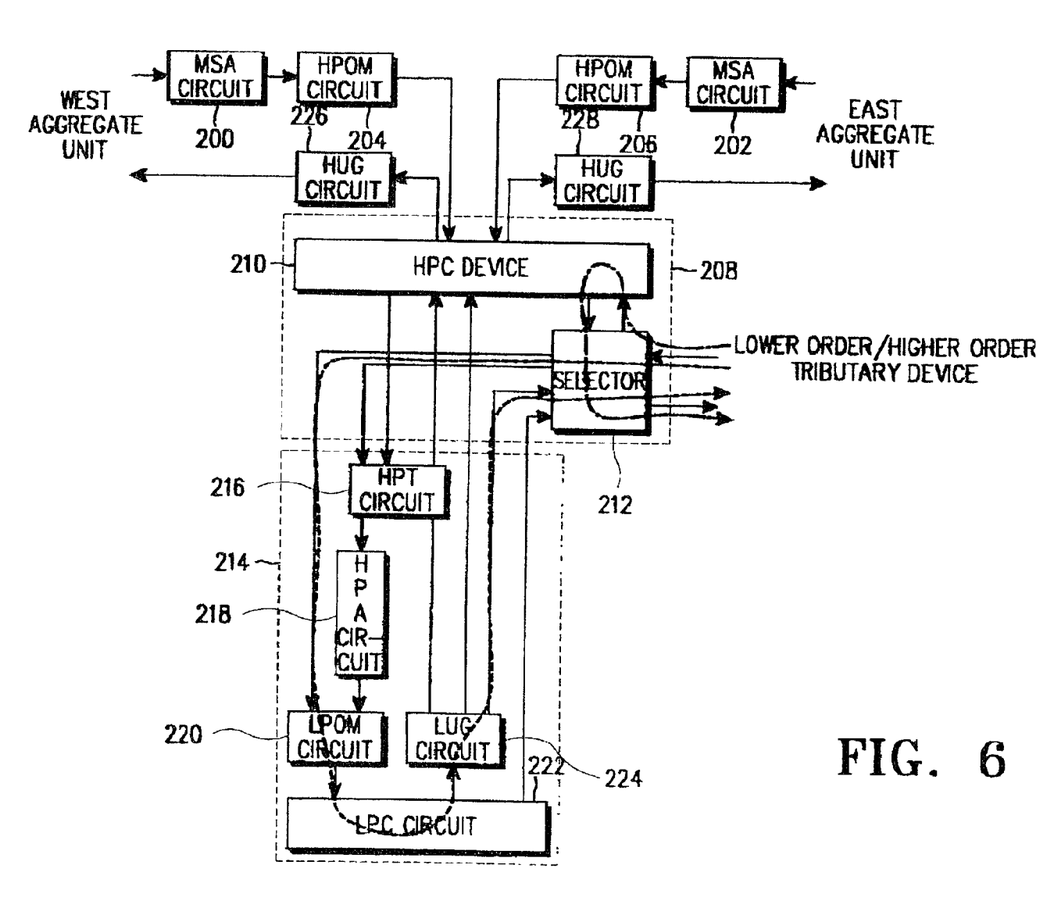

In addition, the lower order path data input from the lower order tributary device to the selector 212, as shown by the dash-dash-dash line in FIG. 6, is delivered through LPOM circuit 220 to LPC circuit 222 to LUG circuit 224 to the selector 212, returning to the lower order tributary device.

In addition, the higher order path data input from the higher order tributary device to the selector 212, as shown by the dash-dot-dash line in FIG. 6, is delivered through HPC device 210 to the selector 212, returning to the higher order tributary device.

Thus, the invention provides the HPC circuit 208 with the selector 212 so that the lower order data passes the lower order data processor to the tributary devices or aggregate units along the path determined by the user. Hence, the path for the lower order tributary device and the path for the higher order tributary are converged to the path through the selector 212, simplifying the structure of the add/drop cross connection apparatus.

While the present invention has been described in connection with specific embodiments accompanied by the attached drawings, it will be readily apparent to those skilled in the art that various changes and modifications may be made thereto without departing the gist of the present invention.

What is claimed is:

1. An add/drop cross connection apparatus connected between east and west aggregate units of a synchronous digital hierarchy system, comprising:
   an aggregate unit matching device for providing matching with the aggregate units;
   a higher order path connection circuit for subjecting received higher order path data to cross connection by space switching;
   a lower order path connection circuit for subjecting received lower order path data to cross connection by time switching; and
   a selector for selectively delivering the data supplied from said aggregate units, higher order tributary device, and lower order tributary device, wherein said selector delivers said data to said higher order path connection circuit or lower order path connection circuit according as said data is the higher or lower order path data.

2. The add/drop cross connection apparatus as set forth in claim 1, wherein said higher order path connection circuit is constructed in the same module with said selector.

3. An add/drop cross connection apparatus having multiplex section adaptation circuits for matching high order path data to a system clock, high order path overhead monitor circuits for monitoring higher order path overheads of data respectively supplied from the east and west aggregate units and high order unequipped generators for generating unequipped signals and transferring data to the east and west units, said add/drop cross connection apparatus being connected between east and wet aggregate units of a synchronous digital hierarchy system, said add/drop cross connection apparatus comprising:
   a higher order path connection circuit for subjecting received higher order path data to cross connection by space switching;
   a lower order path connection circuit for subjecting received lower order path data to cross connection by time switching; and
   a selector connected via a single path to a higher order tributary device and a lower order tributary device, wherein said selector selectively delivers higher order path data from said higher order tributary device to said higher order path connection circuit and selectively delivers lower order path data from said lower order tributary device to said lower order path connection circuit based on whether said data is higher order path data or lower order path data.

4. The add/drop cross connection apparatus as set forth in claim 3, wherein said selector receives data from one of said east and west aggregate units via said higher order path connection circuit and selectively provides the received data to said higher order tributary device when said received data is higher order path data and selectively provides the received data to said lower order tributary device via said lower order path connection circuit when said received data is lower order path data.

5. An add/drop cross connection apparatus connected between aggregate units of a synchronous digital hierarchy system, comprising:
   an aggregate unit matching device for providing matching with the aggregate units;
   a higher order path connection means comprising:
      a higher order path circuit performing cross connection by space switching to communicate data between one of said aggregate units and a higher order tributary device; and
      a selector selectively delivering data between said higher order path circuit to said higher order tributary device when said data is higher order path data;
   a lower order path data processor comprising:
      a lower order path overhead monitor for detecting path overhead bytes of received data;
      a lower order path connection circuit performing cross connection by time switching for subjecting received lower order path data to cross connection; and
      a lower order unequipped generator for generating unequipped signals by unit of VC11 (virtual container-eleven) or VC12 (virtual container-twelve); and
   said selector selectively delivering data to said lower order path overhead monitor from a lower order tributary device when said data is lower order path data.

6. The add/drop cross connection apparatus as set forth in claim 5, said lower order path data processor further comprising:
a higher order path termination circuit for processing a path overhead of a higher order virtual container; and
a higher order path adaptation circuit for aligning data by unit of TU11 (tributary unit-eleven) or TU12 (tributary unit-twelve).

7. The add/drop cross connection apparatus as set forth in claim 6, wherein, when lower order path data is to be delivered to one of said aggregate units from said lower order tributary device, said selector delivers the lower order path data to said lower order path overhead monitor, said lower order path overhead monitor provides the data to said lower order path connection circuit, said lower order path connection circuit provides the data to said lower order unequipped generator, said lower order unequipped generator provides the data to said higher order path termination circuit, said higher order path termination circuit provides the data to said higher order path circuit and said higher order path circuit provides the data to said one of said aggregate units via said aggregate unit matching device.

8. The add/drop cross connection apparatus as set forth in claim 6, wherein, when higher order path data is to be delivered to one of said aggregate units from said higher order tributary device, said selector delivers the higher order path data to said higher order path circuit and said higher order path circuit provides the data to said one of said aggregate units via said aggregate unit matching device.

9. The add/drop cross connection apparatus as set forth in claim 6, wherein, when higher order path data subjected to lower order path cross connection is to be delivered to one of said aggregate units from said higher order tributary device, said selector delivers the higher order path data to said higher order path circuit, said higher order path circuit provides the data to said higher order path termination circuit, said higher order path termination circuit provides the data to said higher order path adaptation circuit, said higher order path adaptation circuit provides the data to said lower order path overhead monitor, said lower order path overhead monitor provides the data to said lower order path connection circuit, said lower order path connection circuit provides the data to said lower order unequipped generator, said lower order unequipped generator provides the data to said higher order path termination circuit, said higher order path termination circuit provides the data to said higher order path circuit and said higher order path circuit provides the data to said one of said aggregate units via said aggregate unit matching device.

10. The add/drop cross connection apparatus as set forth in claim 6, wherein, when lower order path data is to be delivered from one of said aggregate units to said lower order tributary device, said one of said aggregate units delivers the lower order path data to said aggregate unit matching device, said aggregate unit matching device provides the data to said higher order path circuit, said higher order path circuit provides the data to said selector, said selector delivers the data to said higher order path termination circuit, said higher order path termination circuit provides the data to said higher order path adaptation circuit, said higher order path adaptation circuit provides the data to said lower order path overhead monitor, said lower order path overhead monitor provides the data to said lower order path connection circuit, and said lower order path connection circuit provides the data to said lower order tributary device via said selector.

11. The add/drop cross connection apparatus as set forth in claim 6, wherein, when higher order path data is to be delivered from one of said aggregate units to said higher order tributary device, said one of said aggregate units delivers the higher order path data to said aggregate unit matching device, said aggregate unit matching device provides the data to said higher order path circuit, said higher order path circuit provides the data to said selector, and said selector delivers the data to said higher order path tributary device.

12. The add/drop cross connection apparatus as set forth in claim 6, wherein, when higher order path data is to bedelivered from one of said aggregate units to the other one of said aggregate units, said one of said aggregate units delivers the higher order path data to said aggregate unit matching device, said aggregate unit matching device provides the data to said higher order path circuit, said higher order path circuit provides the data to said aggregate unit matching device, and said aggregate unit matching device, provides the data to said other one of said aggregate units.

13. The add/drop cross connection apparatus as set forth in claim 6, wherein, when lower order path data is to be delivered from one of said aggregate units to the other one of said aggregate units, said one of said aggregate units delivers the lower order path data to said aggregate unit matching device, said aggregate unit matching device provides the data to said higher order path circuit, said higher order path circuit provides the data to said higher order path termination circuit, said higher order path termination circuit provides the data to said higher order path adaptation circuit, said higher order path adaptation circuit provides the data to said lower order path overhead monitor, said lower order path overhead monitor provides the data to said lower order path connection circuit, and said lower order path connection circuit provides the data to lower order unequipped generator, said lower order unequipped generator provides the data to said higher order path termination circuit, said higher order path termination circuit provides the data to said higher order path circuit and said higher order path circuit provides the data to said other one of said aggregate units via said aggregate unit matching device.

14. The add/drop cross connection apparatus as set forth in claim 6, wherein, lower order path data input to said selector and returned said lower order tributary device is delivered to said lower order path overhead monitor, said lower order path overhead monitor provides the data to said lower order path connection circuit, said lower order path connection circuit provides the data to said lower order unequipped generator, and said lower order unequipped generator provides the data to said lower order tributary device via said selector.

15. The add/drop cross connection apparatus as set forth in claim 6, wherein, higher order path data input to said selector and returned said higher order tributary device is delivered to said higher order path circuit, and said higher order path circuit provides the data to said higher order tributary device via said selector.

* * * * *